(12) United States Patent
Beier et al.

(10) Patent No.: US 10,895,201 B2
(45) Date of Patent: Jan. 19, 2021

(54) TURBOFAN ENGINE AND A METHOD FOR EXHAUSTING BREATHER AIR OF AN OIL SEPARATOR IN A TURBOFAN ENGINE

(71) Applicant: Rolls-Royce Deutschland Ltd & Co KG, Blankenfelde-Mahlow (DE)

(72) Inventors: Juergen Beier, Schulzendorf (DE); Markus Blumrich, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 293 days.

(21) Appl. No.: 15/494,028

(22) Filed: Apr. 21, 2017

(65) Prior Publication Data

US 2017/0314470 A1    Nov. 2, 2017

(30) Foreign Application Priority Data

May 2, 2016    (DE) .......................... 10 2016 108 068

(51) Int. Cl.
*F02C 7/06*      (2006.01)
*F01D 25/00*    (2006.01)
(Continued)

(52) U.S. Cl.
CPC ................. *F02C 7/06* (2013.01); *B01D 45/04* (2013.01); *B01D 45/12* (2013.01); *F01D 25/00* (2013.01);
(Continued)

(58) Field of Classification Search
CPC ........... F02C 7/06; B01D 45/04; B01D 45/12; B01D 25/00; B01D 25/18; F05D 2220/32; F05D 2260/605; F05D 2260/609
See application file for complete search history.

(56) References Cited

U.S. PATENT DOCUMENTS 5,104,069 A     4/1992  Reising
6,012,281 A *   1/2000  Hauser .................... F02K 1/386
                                                              239/265.17
(Continued)

FOREIGN PATENT DOCUMENTS

DE    102007026060 A1    12/2008
DE    102007058953 A1     6/2009
(Continued)

OTHER PUBLICATIONS

German Search Report dated Jan. 11, 2017 for counterpart German Application No. DE 10 2016 108 068.3.
(Continued)

*Primary Examiner* — Arun Goyal
*Assistant Examiner* — Henry Ng
(74) *Attorney, Agent, or Firm* — Shuttleworth & Ingersoll, PLC; Timothy J. Klima

(57) ABSTRACT

A turbofan engine that comprises a primary flow channel inside of which a primary flow flows through a gas generator during operation, a secondary flow channel inside of which a secondary flow is guided past the gas generator during operation, and an oil separator of a lube oil system that has a pipeline for exhausting breather air, wherein the pipeline forms a pipeline end. It is provided that the pipeline end is arranged inside the secondary flow channel, and is provided and configured for the purpose of discharging breather air directly from the pipeline end into the secondary flow channel.

17 Claims, 6 Drawing Sheets

(51) Int. Cl.
*F01D 25/18* (2006.01)
*B01D 45/04* (2006.01)
*B01D 45/12* (2006.01)

(52) U.S. Cl.
CPC .......... *F01D 25/18* (2013.01); *F05D 2220/32* (2013.01); *F05D 2260/605* (2013.01); *F05D 2260/609* (2013.01)

(56) References Cited

U.S. PATENT DOCUMENTS

| | | |
|---|---|---|
| 6,513,332 B2 | 2/2003 | Care et al. |
| 7,690,184 B2 | 4/2010 | Gauthier et al. |
| 8,122,698 B2 | 2/2012 | Negulescu et al. |
| 8,235,647 B2 | 8/2012 | Pisseloup et al. |
| 8,485,145 B2 | 7/2013 | Palumbo |
| 8,621,839 B2 | 1/2014 | Alecu et al. |
| 8,640,436 B2 | 2/2014 | Thies |
| 8,657,569 B2 | 2/2014 | Sheaf et al. |
| 8,826,637 B2 | 9/2014 | Thies |
| 9,914,081 B2* | 3/2018 | Beier .................. B01D 45/12 |
| 2012/0060508 A1 | 3/2012 | Alecu et al. |
| 2014/0096533 A1 | 4/2014 | Homeyer et al. |
| 2014/0352315 A1* | 12/2014 | Diaz .................. B64D 33/10 60/772 |
| 2015/0007531 A1* | 1/2015 | Beier .................. B01D 45/16 55/385.3 |
| 2016/0131077 A1* | 5/2016 | Debray ................ F01D 25/243 60/770 |
| 2017/0175640 A1* | 6/2017 | Glessner .............. F02C 7/24 |

FOREIGN PATENT DOCUMENTS

| | | |
|---|---|---|
| DE | 102009053002 A1 | 5/2011 |
| DE | 102009059019 A1 | 6/2011 |
| DE | 102012208673 A1 | 11/2013 |
| DE | 102012218135 A1 | 4/2014 |
| EP | 0439923 A1 | 8/1991 |
| EP | 0940338 A2 | 9/1999 |
| EP | 1998011 A2 | 12/2008 |
| EP | 2065303 A2 | 6/2009 |
| EP | 2253538 A2 | 11/2010 |
| EP | 2336503 A2 | 6/2011 |
| EP | 2572987 | 3/2013 |
| GB | 2376269 | 2/2002 |

OTHER PUBLICATIONS

European Search Report dated Oct. 4, 2017 for counterpart European Application No. 17168661.1.

* cited by examiner

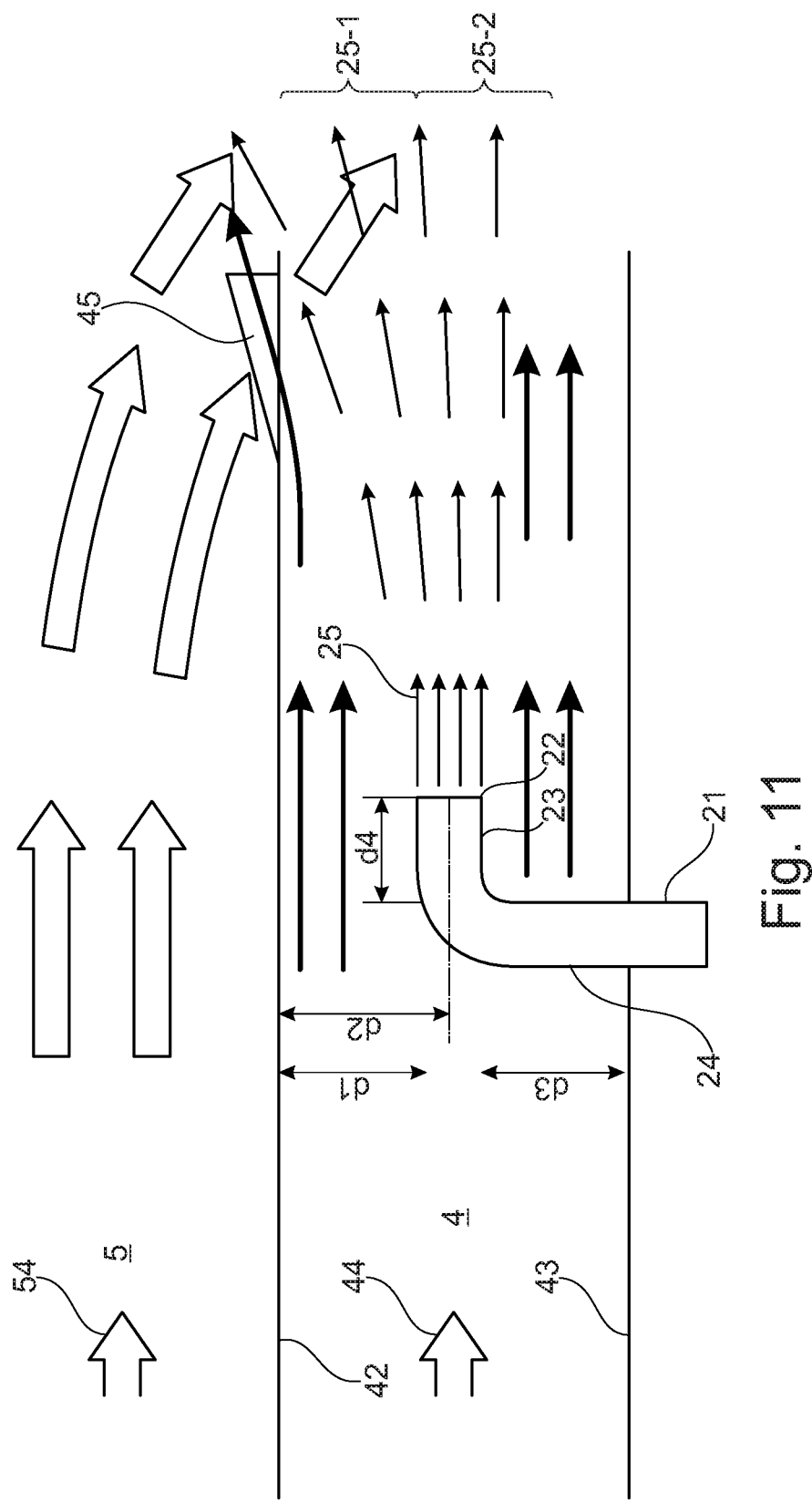

TURBOFAN ENGINE AND A METHOD FOR EXHAUSTING BREATHER AIR OF AN OIL SEPARATOR IN A TURBOFAN ENGINE

REFERENCE TO RELATED APPLICATION

This application claims priority to German Patent Application No. 10 2016 108 068.3 filed on May 2, 2016, the entirety of which is incorporated by reference herein.

BACKGROUND

The invention relates to a turbofan engine and to a method for exhausting breather air of an oil separator in a turbofan engine.

It is known that compressed air that is used for pneumatically sealing the bearing housing of an engine mixes with lube oil. For separating the lube oil from the compressed air, an oil separator (also referred to as a "breather") is used. For example, it is known to use a centrifugal oil separator for that purpose. The oil separator supplies the separated oil to the oil tank, so that the oil remains inside the oil circuit. The remaining compressed air, from which the lube oil has been separated, is blown off via a vent line of the oil separator.

Here, it is known to blow off the ventilation air, which will also be referred to as breather air in the following, into the open at the engine nacelle or at the engine mount. Such an approach is described in EP 2 253 538 B1, for example.

However, the breather air still contains a certain share of residual oil, which is a major reason for the continuous oil consumption of an engine and which may lead to the cowling of the engine or the engine mount being soiled. This soiling is undesirable due to esthetic reasons and can only be removed my means of elaborate cleaning measures, since it burns into the cowling as a result of the high temperature of the engine.

It is known from DE 10 2007 026 060 A1 to arrange a vent line of a lube oil system behind the actual engine at the circumference of the discharged hot engine jet.

U.S. Pat. No. 8,621,839 B2 describes a lube oil system in which an oil collecting device is assigned to an oil separator that is connected to the auxiliary device carrier of the engine, with the ventilation air of the oil separator being cooled and in addition oil is being separated inside that oil collecting device. The oil collecting device is formed inside a strut that is arranged in the secondary flow channel of the engine. The oil collecting device has an outlet window from which the air is discharged into the sheath flow after having been cleaned of oil twice. The oil that is separated in the oil collecting device is collected and recycled back into the oil separator after the flight has ended.

There is a need to provide a turbofan engine and a method for exhausting breather air of an oil separator by means of which a reduction of the visible emissions of an oil separator is achieved.

SUMMARY

According to an embodiment of the invention, a turbofan engine is provided which comprises a primary flow channel, a secondary flow channel, and an oil separator. The oil separator is typically driven by a main gear unit of an auxiliary device carrier of the engine. It has a pipeline for diverting breather air that forms a pipeline end. It is provided that the pipeline end is arranged inside the secondary flow channel and is provided and configured for discharging breather air directly (i.e. without it having to pass any other structures behind the pipeline end) from the pipeline end into the secondary flow channel.

Thus, embodiments of the present invention are based on the idea to blow off the breather air that is contaminated with rests of oil into the secondary flow of the engine (which is also referred to as the sheath flow or the bypass flow). There, the breather air is diluted in such a manner that no visible residues can be perceived. Apart from that, the breather air that is contaminated with rests of oil does not pass any exterior cowlings of the engine, so that the danger of visible staining is reduced. An additional dilution of the breather air or of the rests of oil contained therein can occur inside the engine mixer that performs the intermixing of the primary flow and the secondary flow at the engine exit.

The invention is associated with the further advantage that, due to the arrangement inside the secondary flow channel, a higher pressure is present at the pipeline end of the pipeline that is connected to the oil separator as compared to the situation that the breather air is blown off into the environment. This means that a higher pressure is present at the pipeline end in the pressure chain between the oil tank, the oil separator and the pipeline end. Since in general a defined minimum pressure has to be present inside the oil tank to ensure that an oil pump that is connected to the oil tank can be operated in a safe manner, it is known to arrange a pressure raising valve, also known as PRV, between the oil tank and the oil separator. If now, according to the present invention, a higher pressure is present at the outer end of the pressure chain, namely at the pipeline end (due to the fact that the pipeline end ends inside the secondary flow channel), such a pressure raising valve can be economized or can be designed for a lower pressure.

According to one embodiment of the invention, it is provided that the pipeline end is formed at an end section of the pipeline that extends in parallel to the flow direction which the secondary flow forms adjacent to the end section. What is understood here by a parallel alignment of the end section with respect to the flow direction inside the secondary flow channel is also an alignment that slightly deviates from the exactly parallel alignment, namely by maximally 10°.

The end section can for example be formed in a linear or slightly bent manner. Here it can be provided that the end section extends on a meridional streamline inside the secondary flow channel, that is, on a streamline that has the same spacing ratio to the inner wall and the outer wall of the secondary flow channel across the length of the secondary flow channel.

Here, according to an embodiment of the invention, a minimum length of the end section is provided that ensures that the breather air already has the same flow direction as the secondary flow when the breather air is blown off into the secondary flow. In this manner, turbulences in the breather air inside the secondary flow are avoided or reduced. For example, this minimum length can be equal to the internal diameter of the pipeline end, in particular equal to five times the internal diameter of the pipeline end. If the pipeline end is not round, the largest internal diameter is referred to as the internal diameter, i.e. the minimum length is equal to the largest internal diameter of the pipeline end or equal to five times the largest internal diameter of the pipeline end.

In one embodiment of the invention, it is provided that the pipeline end is placed in such a manner inside the secondary flow channel that at least a part of the breather air that is discharged from the pipeline end is supplied to the mixer that performs an intermixing of the primary flow and the secondary flow at the end of the engine. For example, the pipeline end is placed in such a manner inside the secondary flow channel that at least 30%, in particular at least 50%, in particular at least 70% of the breather air that is discharged from the pipeline end is supplied to the mixer and is mixed inside the same with air of the primary flow channel. Because the mixer additionally dilutes the breather air it is advantageous to supply at least a part of the breather air to the mixer. At that, it can also be advantageous if not the entire breather air is supplied to the mixer, but to guide a part past the mixer into the secondary flow channel in order to distribute the breather air with the rests of oil over an outlet area that is as large as possible.

The secondary flow channel has a radially inner flow path boundary and a radially outer flow path boundary that will be referred to in the following as the inner wall and the outer wall. According to one embodiment of the invention, it is provided that the pipeline end is arranged closer to the inner wall, wherein a minimum distance to the inner wall should be given, however, which for example corresponds to the length of the diameter of the pipeline end. By observing a minimum distance, it is ensured that the adjacent wall of the secondary flow channel is not soiled by the rests of oil that are present in the breather air. By arranging the pipeline end closer to the inner wall of the secondary flow channel it can be ensured that a defined portion of the breather air or even the entire breather air is supplied to the mixer at the engine exit.

However, it should be understood that alternatively it can also be provided that the pipeline end is arranged closer to the outer wall of the secondary flow channel, wherein in turn a minimum distance to the outer wall should be observed, which is for example equal to the length of the diameter of the pipeline end.

In one embodiment of the invention, it is provided that the pipeline end is arranged inside the secondary flow channel in the rear 20%, in particular in the rear 10%, of the axial length of the same. Thus, the breather air that is discharged from the pipeline end is thus blown off into the secondary flow only in the rear area of the secondary flow channel as viewed in the axial direction, and thus at a relatively small distance in front of the mixer.

The axial length of the secondary flow channel is defined as the axial distance between the upstream end of a splitter, starting from which the primary flow channel and the secondary flow channel are separated, and the downstream end of the secondary flow channel, which can be defined by a mixer.

At that, it can additionally be provided that the pipeline end is placed in a location inside the secondary flow channel where no more structures are present inside the secondary flow channel in the flow direction, in particular no struts or structures for guiding leads. It can also be provided that no openings for bleed air are present in the secondary flow channel behind the pipeline end. By avoiding structures of any kind behind the location where the breather air is blown off into the secondary flow, it is avoided that such structures are contaminated by rest of oil. Likewise, it is avoided that any turbulences in the breather air occur at such structures.

In one embodiment of the invention, it is provided that the pipeline of the oil separator extends at least partially inside a structure that is integrated into the secondary flow channel. At that, it is provided that the pipeline end projects from the axially rear downstream end of the structure in flow direction. The mentioned structure can for example be a strut (also referred to as a "splitter") that has a certain axial expansion and extends into the secondary flow channel in the radial direction while having a small expansion in the circumferential direction, wherein the strut serves for accommodating pipelines, for example for compressed air, fuel and oil as well cables, and to guide such pipelines and cables in a protected manner in the radial direction through the secondary flow channel. The strut in one embodiment is arranged downstream of a ring-shaped support structure which structurally supports the fan housing. In particular the strut may be arranged between such support-structure and a mixer.

It can be provided that a rear section of the oil line that is coming from the oil separator is configured in a rectangular manner, wherein a first section protrudes into the strut in the radial direction and a second section (end section) that protrudes perpendicularly from the first section protrudes from the axially rear end of the strut and blows off breather air into the secondary flow channel at a distance from the axially rear end of the strut. In the end section, the breather air is aligned in parallel to the flow direction in the secondary flow before being blown off and mixed with the secondary flow.

In another embodiment of the invention, it is provided that the pipeline is configured without loops between the oil separator and the pipeline end, and that it extends in such a manner that it has an upward slope towards the pipeline end if the turbofan engine is arranged at the wing of an airplane. Thus, in the mounted engine, the oil separator is located deeper than the pipeline end. In this manner it is achieved that oil that is separated in the pipeline flows back to the oil separator.

The invention also relates to a method for exhausting breather air of an oil separator in a turbofan engine in which breather air is exhausted by means of a pipeline of the oil separator that comprises a pipeline end. It is provided that the breather air is exhausted by means of the pipeline directly into the secondary flow channel, wherein the pipeline end is arranged inside the secondary flow channel, and the breather air is exhausted from the same directly (i.e. without passing other structures behind the pipeline end) into the secondary flow channel.

According to one embodiment of this method it is provided that the breather air is transported before being blown off in an end section of the pipeline that is arranged inside the secondary flow channel and extends inside the same substantially in parallel to the flow direction. Subsequently, the breather air is blown off in parallel to the flow direction. In the end section that is aligned in parallel to the flow direction, the breather air is subjected to an alignment in flow direction, so that it can be blown off into the secondary flow substantially without turbulences.

It is provided in one embodiment of the invention that the breather air is blown off into the secondary flow channel in front of the mixer, which performs an intermixing of the primary flow and the secondary flow, namely in such a manner that a part of the blown off breather air is supplied to the mixer and a part of the blown off breather air is guided past the mixer. In this manner it is achieved that the breather air is distributed over an outlet area that is as large as possible.

BRIEF DESCRIPTION OF THE DRAWINGS

The invention will be explained in more detail on the basis of exemplary embodiments with reference to the accompanying drawings in which:

FIG. 11 schematically shows the arrangement of the end section of an air discharge line of an oil separator inside the secondary flow channel of a turbofan engine.

DETAILED DESCRIPTION

Figure 1:
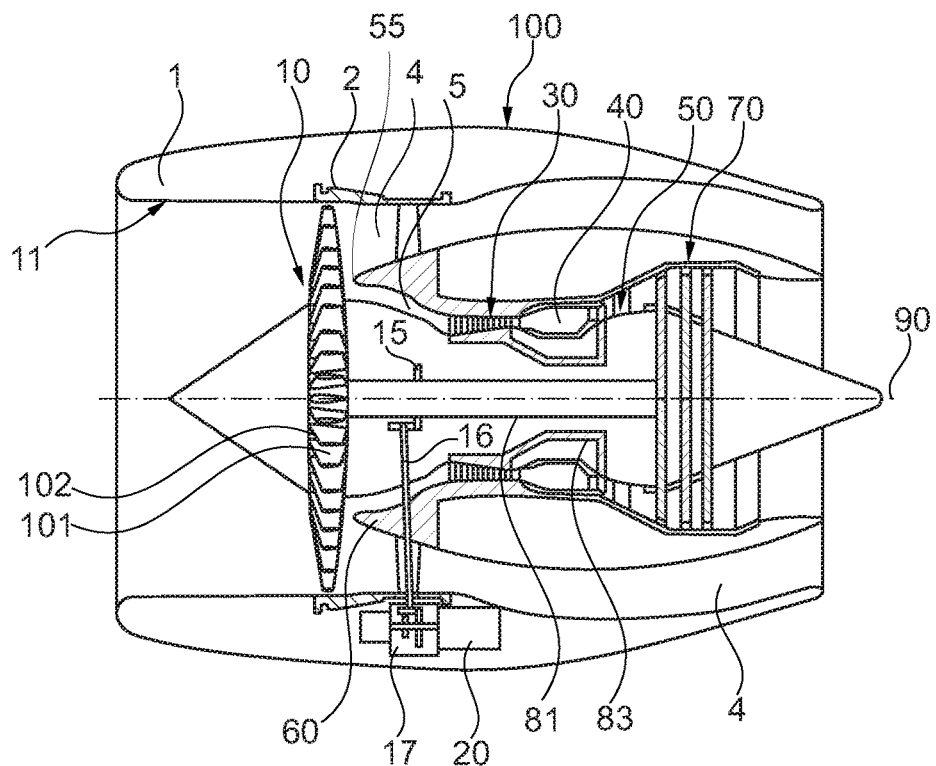
FIG. 1 shows a simplified schematic sectional view of a turbofan engine, wherein the turbofan engine comprises an auxiliary device carrier that is arranged at a fan housing and has an oil separator.
Figure 2:
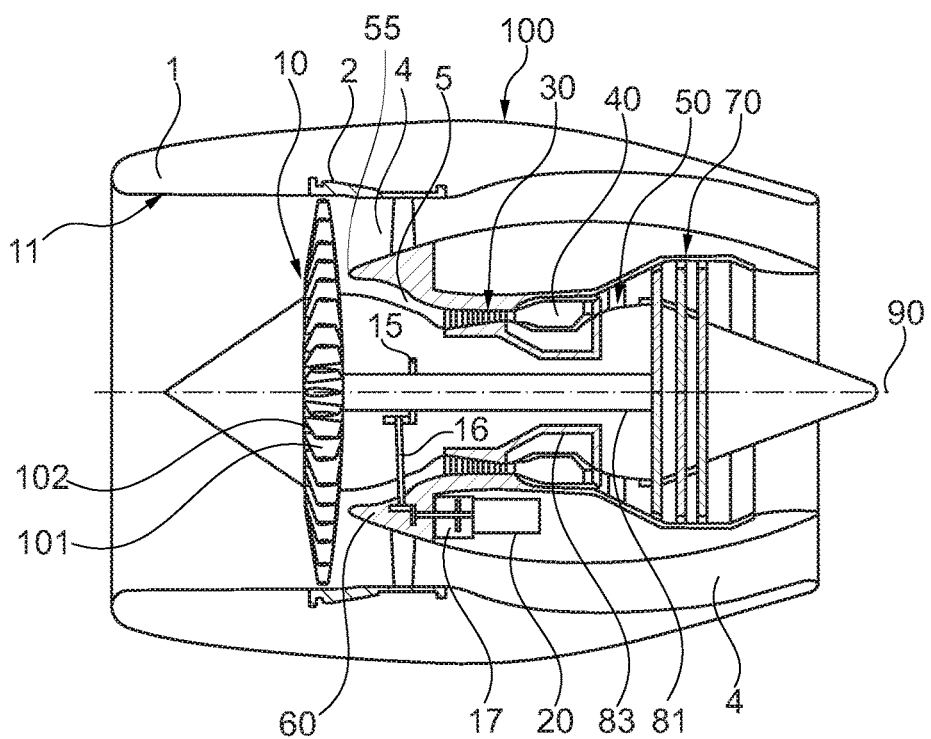
FIG. 2 shows a turbofan engine corresponding to FIG. 1, wherein the auxiliary device carrier with the oil separator is arranged at the outer casing of the core engine.

FIGS. 1 and 2 show, in a schematic manner, a turbofan engine 100 that has a fan stage with a fan 10 as the low-pressure compressor, a high-pressure compressor 30, a combustion chamber 40, a high-pressure turbine 50, and a low-pressure turbine 70.

The turbofan engine 100 comprises two separate shafts, a low-pressure shaft 81 that connects the low-pressure turbine 70 to the fan 10, and a high-pressure shaft 83 that connects the high-pressure turbine 50 to the high-pressure compressor 30. If the turbofan engine additionally has a medium-pressure compressor and a medium-pressure turbine, also a low-pressure shaft is present that connects the medium-pressure turbine to the medium-pressure compressor.

The turbofan engine 100 has an engine nacelle 1 that forms an engine inlet 11 at the entrance side which supplies inflowing air to the fan 10. The fan 10 has a plurality of fan blades 101 that are connected to a fan disc 102. Here, the annulus of the fan disc 102 forms the radially inner delimitation of the flow path through the fan 10. Radially outside, the flow path is delimited by a fan housing 2. A nose cone is arranged upstream of the fan disc 102.

Behind the fan 10, the turbofan engine 100 forms a secondary flow channel 4 and a primary flow channel 5. The intake air is split behind the fan 10 by means of a splitter 55 into a secondary flow, which flows through the secondary flow channel 4, and a primary flow, which flows through the primary flow channel. The primary flow channel 5 leads through the core engine which comprises the gas turbine that is formed by the high-pressure compressor 30, the combustion chamber 40, the high-pressure turbine 50. The primary flow channel 5 is surrounded by a circumferential housing 60 which forms an annulus surface at the internal side, delimitating the primary flow channel 5 radially outside. Radially inside, the primary flow channel 5 is delimited by corresponding rim surfaces of the rotors and the stators of the respective compressor stages, or by the hub, or by the elements of the corresponding drive shaft connected to the hub.

During operation of the turbofan engine 100, a primary flow flows through the primary flow channel 5 with the gas generator 30, 40, 50. The secondary flow channel 4, which is also referred to as the bypass flow channel, sheath flow channel or bypass channel, guides the air that is suctioned in by the fan 10 during operation of the turbofan engine 100 past the gas turbine 30, 40, 50.

The described components have a common symmetry axis 90. The symmetry axis 90 defines an axial direction of the turbofan engine. A radial direction of the turbofan engine extends perpendicularly to the axial direction.

The engine 100 further comprises an auxiliary device carrier 17 that drives a plurality of auxiliary devices via a main shaft. Among other components, an oil separator 20 is driven as an auxiliary device. The auxiliary device carrier 17 is coupled to a low-pressure shaft 81 via a radial shaft 16 and an angular gear 15. Alternatively, it can be provided that the auxiliary device carrier 17 is coupled to the high-pressure shaft 81 via a radial shaft and an angular gear. In FIG. 1, the auxiliary device carrier 17 with the oil separator 20 is arranged at the exterior side of the fan housing 2. In FIG. 2, it is alternatively provided that the auxiliary device carrier 17 with the oil separator 20 is arranged at the outer casing of the core engine, for example at the circumferential housing 60 or at a structure connected therewith.

The oil separator 20 fulfills the function of separating the lube oil of the engine lube oil system from the compressed air. It may for example be a centrifugal oil separator. Separated oil is supplied from an oil separator 20 to an oil tank (not shown), so that it remains inside the oil circuit of the engine lube oil system. The remaining compressed air, from which the lube oil has been separated, is blown off via an air discharge line of the oil separator 20.

In the context of the present invention, the design of such an air discharge line and the placement of the end of the air discharge line inside the engine are of particular importance, as will be described in the following.

Figure 3:
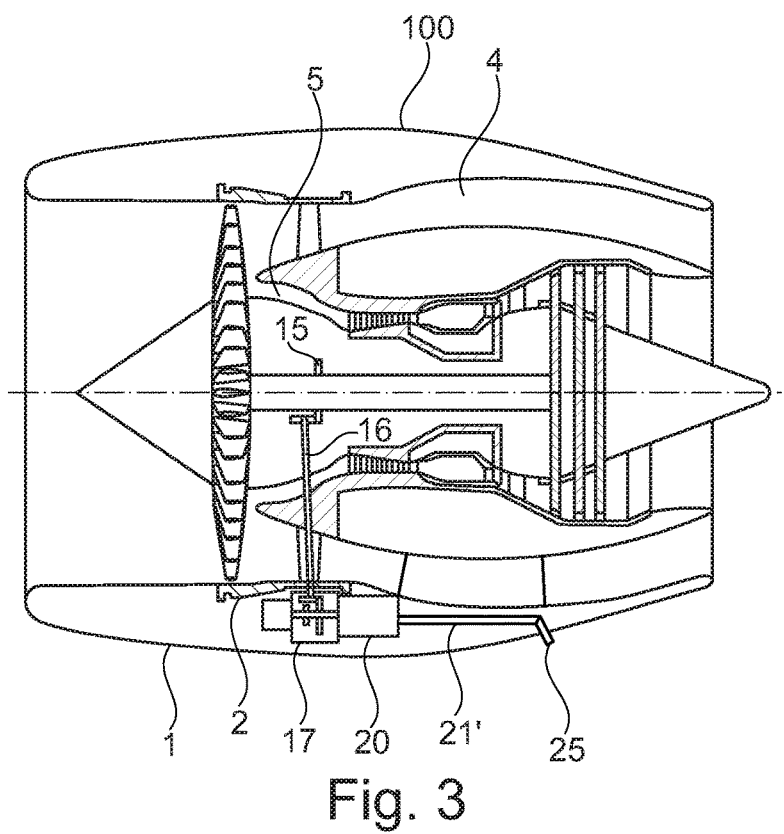
FIG. 3 shows a turbofan engine according to FIG. 1 according to the state of the art, wherein an air discharge line of the oil separator ends at the outer circumference of the engine nacelle.

Before the present invention is discussed in more detail, the design of an air discharge line according to the state of the art is explained based on FIG. 3 in order to provide a better understanding of the background of the invention. According to FIG. 3 it is provided that an air discharge line 21' that is connected to the oil separator 20 is guided to the outer casing or the fairing of the engine nacelle 1. The breather air 25 that is contained in the air discharge line 21' contains a share of residual oil. The blowing off of the breather air at the engine cowling leads to the latter being stained, which is undesirable due to esthetic reasons.

Figure 4:
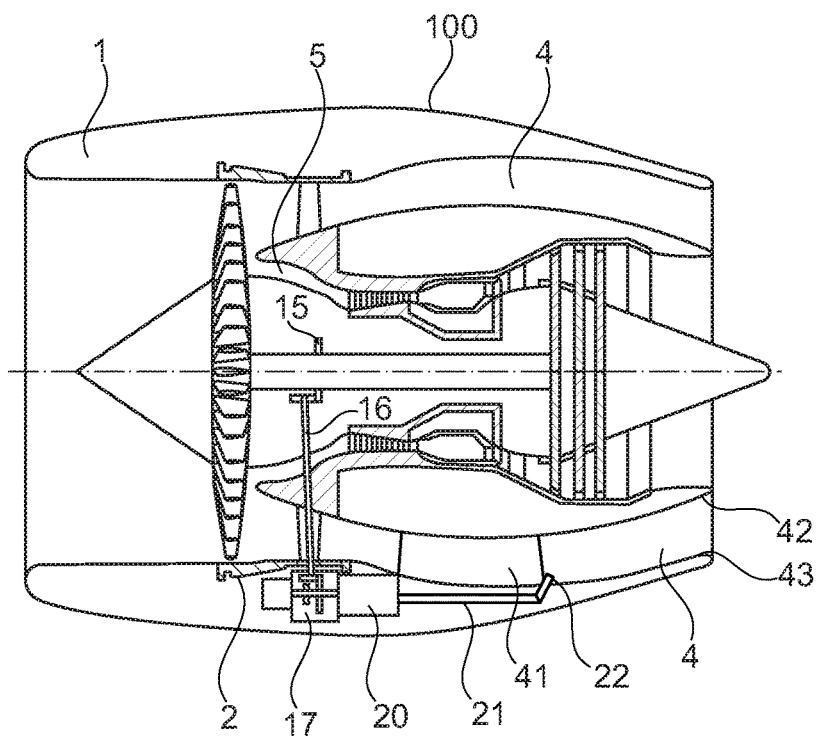
FIG. 4 shows an exemplary embodiment of a turbofan engine, in which the air discharge line of an oil separator that is arranged at the fan housing ends inside the secondary flow channel.

FIG. 4 shows, in a schematic manner, an exemplary embodiment of the invention. Via a main shaft (not shown), an auxiliary device carrier 17 drives an oil separator 20, among other components. In the oil separator 20, lube oil is separated from compressed air. The oil separator 20 has an air discharge line 21 which is a pipeline for discharging the breather air of the oil separator 20, and which contains a mixture of warm air and a share of residual oil. The compressed air that is separated in the oil separator 20 and blown off via the air discharge line 21 is also referred to as breather air. The air discharge line 21 can be embodied in a flexible or rigid manner, and can in principle be made of any material that is resistant against the present temperatures. It can for example be a metal pipe. It may at least in sections have a constant diameter. The air discharge line 21 will also be referred to as a pipeline in the following.

The pipeline 21 has a pipeline end 22 that is arranged inside the secondary flow channel 4 of the turbofan engine 100 and that exhausts or blows off breather air into the secondary flow channel 4 directly, i.e. without the breather air passing further components behind the pipeline end 22, such as for example another oil separator device or an oil collecting device. Breather air that is discharged from the pipeline end 22 is discharged from the pipeline end 22 directly into the secondary flow channel 4.

Figure 5:
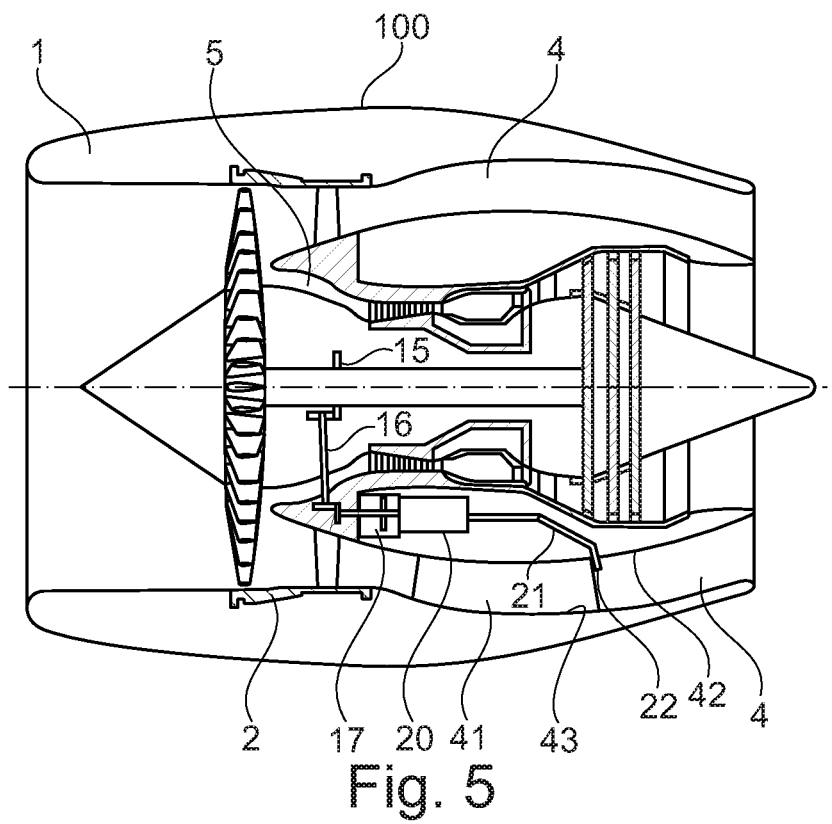
FIG. 5 shows an exemplary embodiment of a turbofan engine, in which the air discharge line of an oil separator that is arranged at the outer casing of the core engine ends inside the secondary flow channel.

In FIG. 4, the auxiliary device carrier 17 with the oil separator 20 is arranged according to FIG. 1 at the exterior side of the fan housing 2. The direct discharge of breather air into the secondary flow channel 4 as it is provided according to the present invention can also be provided if the auxiliary device carrier 17 with the oil separator 20 is arranged at the circumferential housing 60 or at the outer casing of the core engine according to FIG. 2. FIG. 5 shows a pipeline 21 in such an arrangement, which is guided from the oil separator 20 into the secondary flow channel 4 and the end 22 of which is arranged inside the secondary flow channel 4 in order to blow off breather air contaminated with oil directly into the secondary flow channel 4.

FIGS. 4 and 5 further show a structure 41 that is arranged inside the secondary flow channel 4 and that extends in the radial direction between the inner wall 42 and the outer wall 43 of the secondary flow channel 4 while having a small extension in the circumferential direction as well as a certain axial extension. The structure 41 can for example be a strut (also referred to as a splitter) that serves for radially passing of engine instrumentations and lines for compressed air, fuel or oil, for example. The pipeline end 22 is arranged—with respect to the flow direction—behind the structure 41 inside the secondary flow channel 4.

In the embodiment of FIG. 4, the pipeline 21 is guided to the secondary flow channel 4 from the outside. In the embodiment of FIG. 5, the pipeline 21 is guided to the secondary flow channel 4 from the inside.

It is to be understood that the rendering of the pipeline 21 in FIGS. 4 and 5, and also in FIGS. 6 and 7 that will be explained in the following, represents merely a schematic illustration. In particular, it can be provided in contrast to the renderings in these FIGs. that the pipeline 21 is realized without any kink points, and that the pipeline end 22 is formed at an end section of the pipeline 21 which is not slanted but instead projects into the secondary flow channel 4 in flow direction, as will be described in the following.

Figure 6:
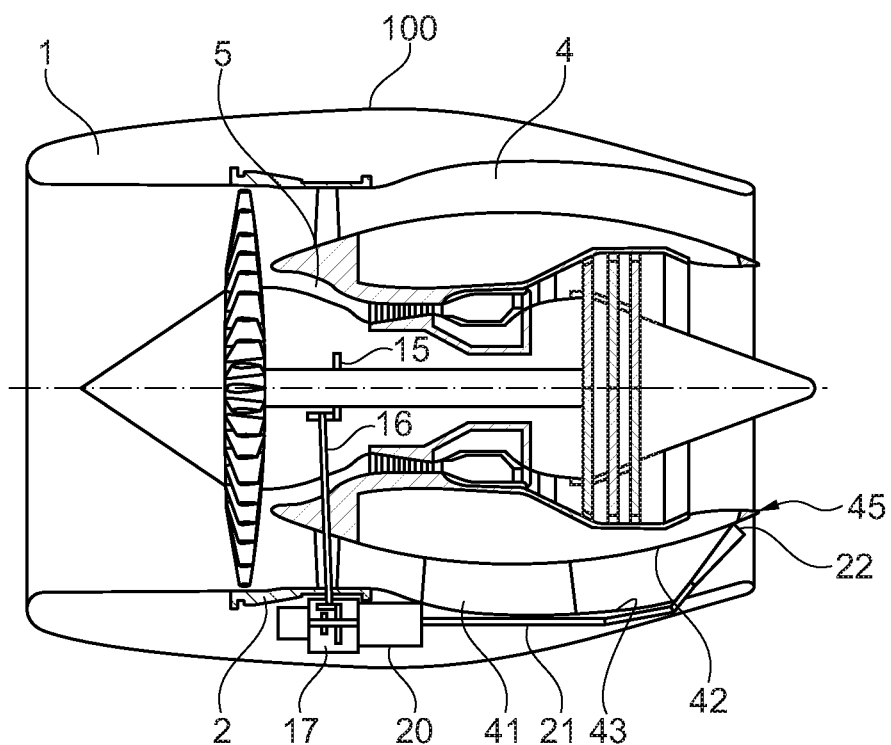
FIG. 6 shows another exemplary embodiment of a turbofan engine, in which the air discharge line of an oil separator that is arranged at the fan housing ends shortly in front of the mixer inside the secondary flow channel.

FIG. 6 shows an exemplary embodiment that differs from the exemplary embodiment of FIG. 4 in that the pipeline end 22 ends at a short distance in front of a mixer 45 inside the secondary flow channel 4, which performs an intermixing of the primary flow and the secondary flow of the turbofan engine 100. At that, the pipeline end 22 ends adjoining the inner wall 42, but at a defined distance from the same.

Figure 7:
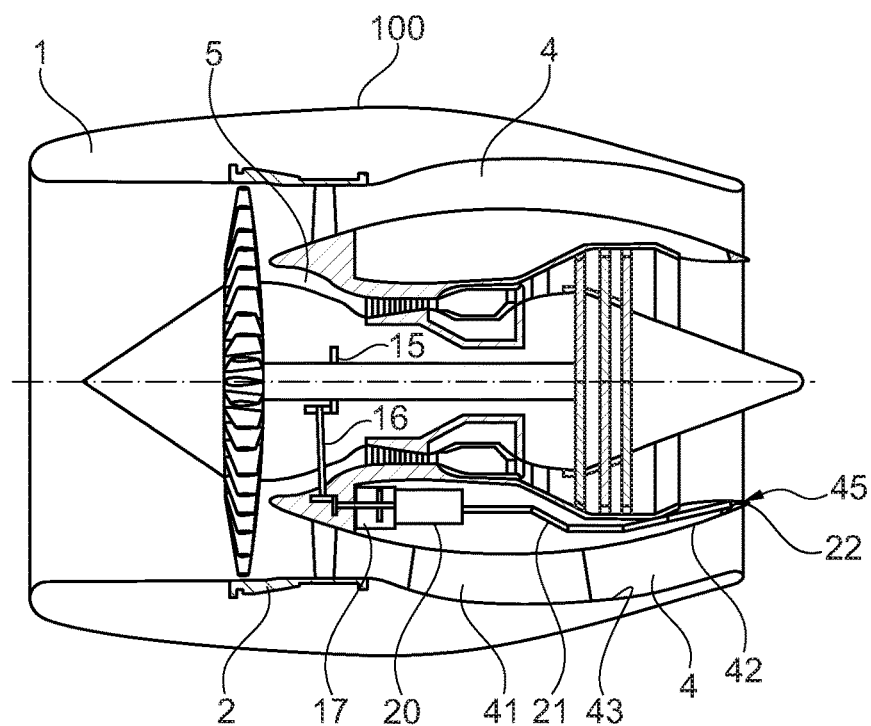
FIG. 7 shows another exemplary embodiment of a turbofan engine, in which the air discharge line of an oil separator that is arranged at the outer casing of the core engine ends shortly in front of the mixer inside the secondary flow channel.

FIG. 7 shows an exemplary embodiment that differs from the exemplary embodiment of FIG. 5 in that the pipeline end 22 ends at a small distance in front of a mixer 45 inside the secondary flow channel 4. The pipeline end 22 also ends adjoining the inner wall 42, but at a defined distance from the same.

As for the exemplary embodiments of FIGS. 4 to 7, the pipeline end 22 is placed in such a manner inside the secondary flow channel 4 that no further structures or openings (for example for bleed air) are present in the secondary flow channel 4 behind the pipeline end 22, so that the breather air that is blown into the secondary flow channel 4 has no or only minor turbulences.

Further it applies to all exemplary embodiments of FIGS. 4 to 7 that the pipeline end 22 is arranged inside the secondary flow channel 4 in the rear 20%, in particular in the rear 10%, of the axial length of the same. If thus the axial expansion of the secondary flow channel 4 between the fan 10 and the mixer 45 is regarded, the pipeline end 22 is arranged at a location inside the secondary flow channel 4 that lies in the 20% or the 10% of the axial extension of the secondary flow channel 4, which are formed in front of the mixer 45. At that, the axial distance of the pipeline end 22 to the mixer 45 is greater in the exemplary embodiments of FIGS. 4 and 5 than in the exemplary embodiments of FIGS. 6 and 7. In the exemplary embodiments of FIGS. 6 and 7, it lies in the rear 10%, in particular in the rear 5%, of the axial length of the secondary flow channel 4, for example.

Further, it also applies to FIGS. 6 and 7 that the pipeline end 22 is arranged at an axial distance to the axially rear end of the strut 41 in flow direction.

Figure 8:
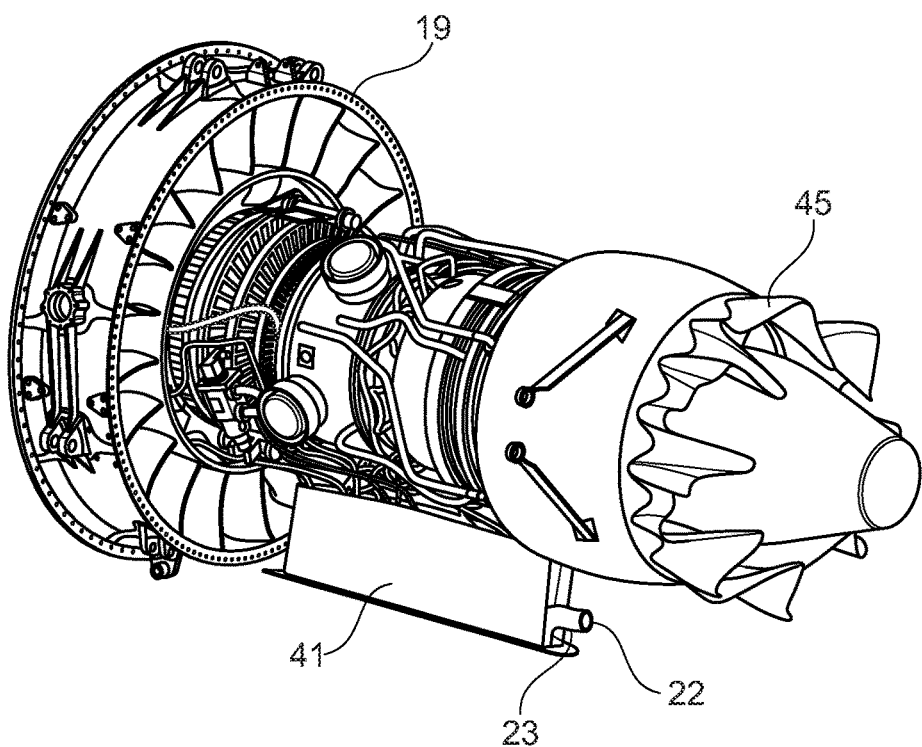
FIG. 8 shows a perspective view of the outer casing of a core engine, including the rendering of a strut that extends in the radial direction inside the secondary flow channel (not shown) and that accommodates a section of the air discharge line of an oil separator.

FIG. 8 shows, in a perspective view, the outer contours of the engine structures that encase the core engine. As far as the secondary flow channel is concerned, only a ring-shaped support structure 19 is shown that structurally supports the fan housing and that may comprise guide vanes, as well as a strut 41 is shown that extends in the radial direction between the inner wall and the outer wall of the secondary flow channel, for example serving for the radial passing of engine instrumentations and pipelines for compressed air, fuel or oil through the secondary flow channel. Further, a mixer 45 is shown that mixes the primary flow of the primary flow channel and the secondary flow of the secondary flow channel at the engine exit. The strut 41 extends downstream of the ring-shaped support structure 19 in an area between the support structure 19 and the mixer 45.

Figure 9:
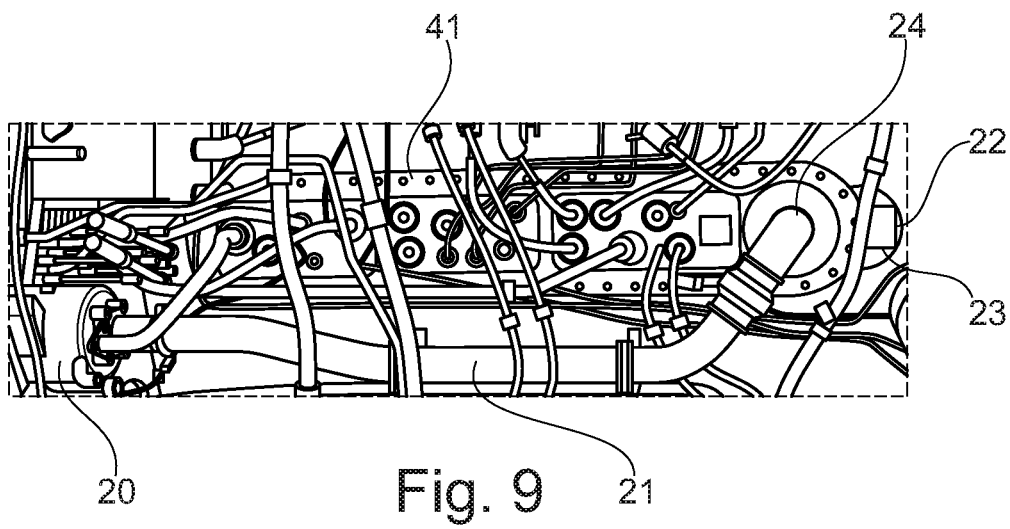
FIG. 9 shows a first detailed view of the arrangement of FIG. 8.
Figure 10:
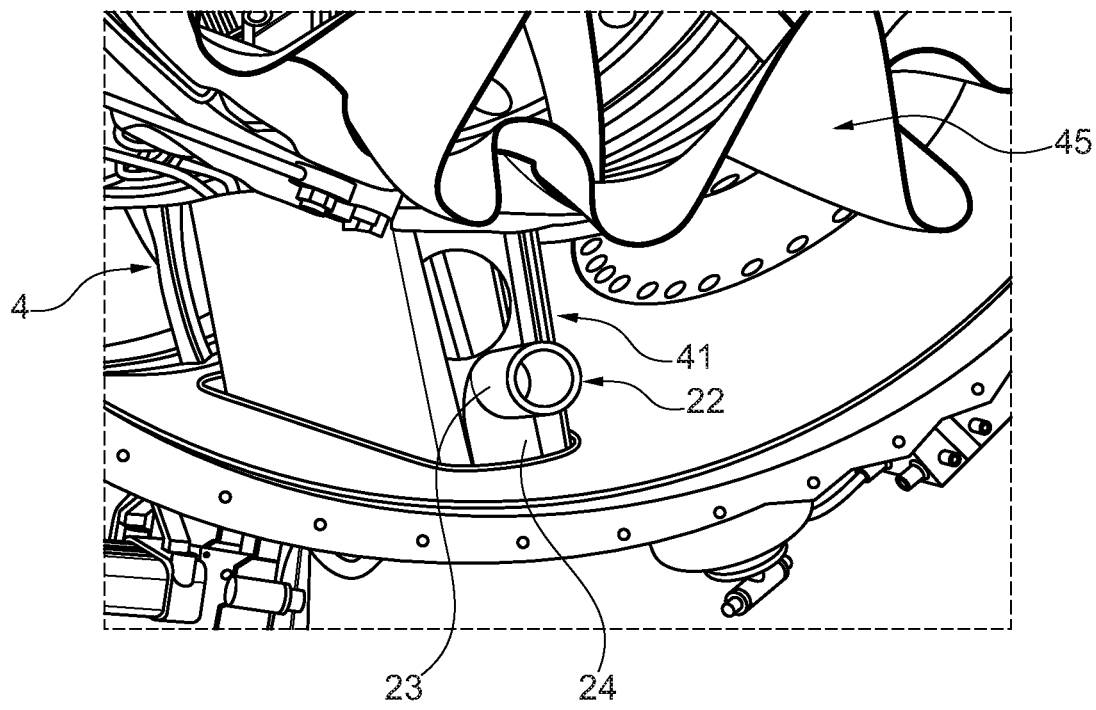
FIG. 10 shows a second detailed view of the arrangement of FIG. 8.

As can also be seen from FIGS. 9 and 10, which are detailed illustrations of FIG. 8, the pipeline 21 at least partially extends inside the strut 41. Thus, the pipeline 21 forms a first rear section 24 in front of the pipeline end 22 and a second rear section 23 connecting thereto, wherein the second rear section 23 forms the pipeline end 22. The first rear section 24 and the second rear section 23 extend in a rectangular manner with respect to each other. Here, the first rear section 24 is arranged inside the strut 41. The second rear section 22 partially extends inside the strut 41, but protrudes with respect to the same in flow direction, so that the pipeline end 22 is positioned freely, without any surrounding structures, inside the secondary flow channel 4.

FIG. 11 illustrates, in a schematic manner, the arrangement of the pipeline end 22 of a pipeline 21 for exhausting breather air of an oil separator in the secondary flow channel 4. The pipeline 21 comprises an end section 23 that forms the pipeline end 22.

The primary flow channel 5 and the secondary flow channel 4 are schematically shown as having a primary flow 54 and a secondary flow 44. The primary flow 54 and the secondary flow 44 are intermixed at the engine exit inside a mixer 45. The secondary flow channel 4 comprises an inner wall 42 and an outer wall 43.

The end section 23 of the pipeline 21 extends across a length d4 in the direction of the secondary flow 44. For this purpose, the end section 23 is configured in a straight manner and is aligned in such a manner that it extends at least approximately on a meridional line, i.e. on the line the points of which have the same spacing ratio to the inner wall 42 and the outer wall 43 of the secondary flow channel 4. By guiding the breather air inside the end section 23 it is achieved that the breather air that is guided inside the pipeline 21 is already aligned in parallel to the flow direction before being blown off into the flow 44. In this manner, any turbulences in the breather air, which is identified by the number 25 in FIG. 11, is avoided or minimized. According to an exemplary embodiment, the length d4 amounts to five times the internal diameter of the circular pipeline end 22.

FIG. 11 further shows a minimum distance d1 and a maximum distance d2 that the pipeline end 22 has from the inner wall 42. The minimum distance d1 can for example be equal to the internal diameter of the pipeline end 22. The maximum distance d2 can be designed in such a manner that the pipeline end 22 is arranged closer to the inner wall 42 than to the outer wall 43 of the secondary flow channel 4. Thus, it is provided in one embodiment of the invention that the pipeline end 22 is located closer to the inner wall 42. In this manner, it is ensured that a portion of the breather air 25 is supplied to the mixer 45 and is distributed by the same. For example, the maximum distance can be ten times, five times or ten times the internal diameter of the pipeline end 22.

FIG. 11 also shows a minimum distance d3 of the pipeline end 22 to the outer wall 43. This minimum distance d3 can also be equal to the internal diameter of the circular pipeline end 22, for example.

Due to its parallel alignment with respect to the flow 44, the breather air 25 that is blown off from the pipeline end 22 is blown off substantially without any turbulences. Thus, the breather air 25 flows substantially in parallel to the secondary flow 44, as shown in FIG. 11. If the pipeline end 22 is arranged in a suitable manner adjacent to the inner wall 42, a part 25-1 of the breather air 25 is supplied to the mixer 45, while another part 25-2 of the breather air is guided past the mixer 45 and does not participate in the mixing procedure. In this manner, a maximally large outlet area for the breather air 25 and thus a maximal degree of dilution of the contained oil particles can be achieved.

Depending on the placement of the pipeline end 22 in the secondary flow channel 4 it can be achieved that the breather air 25 is supplied to the mixer 45 in its entirety, partially or not at all.

Usually, the secondary flow 44 has a higher flow velocity than the breather air 25. Thus, a minor suction effect is present, sucking breather air 25 from the pipeline end 22.

The present invention is not limited in its embodiment to the above-described exemplary embodiments, that are to be understood merely as examples. For instance, the shape and the arrangement of the pipeline for discharging breather air are to be understood to be merely as examples.

It is furthermore pointed out that the features of the individually described exemplary embodiments of the invention can be combined in various combinations with one another. Where areas are defined, they include all the values within these areas and all the sub-areas falling within an area.

What is claimed is:

1. A turbofan engine, comprising:
a primary flow channel extending through a gas generator wherein a primary flow flows through the gas generator via the primary flow channel during operation of the turbofan engine;
a secondary flow channel for guiding a secondary flow past the gas generator during the operation of the turbofan engine;
an oil separator of a lube oil system, wherein the oil separator includes a pipeline for discharging breather air;
a pipeline end formed from a portion of the pipeline at an axially downstream end section of the pipeline;
a strut arranged in the secondary flow channel;
wherein the pipeline extends at least partially inside the strut, and wherein the pipeline end protrudes from an axially downstream end of the strut in a direction of the secondary flow and opens directly to the secondary flow channel, discharging breather air directly from the pipeline end into the secondary flow channel;
wherein the pipeline end extends from the pipeline in a direction parallel to the direction of the secondary flow inside the secondary flow channel to discharge the breather air in the direction parallel to the direction of the secondary flow; and
wherein the pipeline end is arranged inside the secondary flow channel in a downstream 20% of an axial length of the secondary flow channel.

2. The turbofan engine according to claim 1, wherein a length of the pipeline end is at least equal to an internal diameter of the pipeline end.

3. The turbofan engine according to claim 2, wherein the length of the pipeline end is at least equal to five times the internal diameter of the pipeline end.

4. The turbofan engine according to claim 1, further comprising:
a mixer for intermixing the primary flow and the secondary flow;
wherein the mixer is arranged axially downstream from the pipeline end; and
wherein the pipeline end is arranged inside the secondary flow channel to supply breather air to the mixer.

5. The turbofan engine according to claim 4, wherein the pipeline end is arranged in the secondary flow channel to supply at least 30% of the breather air from the pipeline end to the mixer.

6. The turbofan engine according to claim 1, wherein:
the secondary flow channel further comprises an inner wall and an outer wall;
an annular space formed between the inner wall and the outer wall; and
wherein the pipeline end is arranged closer to the inner wall than the outer wall.

7. The turbofan engine according to claim 6, wherein a distance from the pipeline end to the inner wall is at least equal to an internal diameter of the pipeline end.

8. The turbofan engine according to claim 1, wherein no structures are present axially downstream of the pipeline end in the secondary flow channel in the direction of the secondary flow.

9. The turbofan engine according to claim 1, wherein no openings for bleed air are present axially downstream of the pipeline end in the secondary flow channel in the direction of the secondary flow.

10. The turbofan engine according to claim 1, wherein the strut extends in a radial direction inside the secondary flow channel.

11. The turbofan engine according to claim 1, wherein the pipeline is configured without a pipe loop between the oil separator and the pipeline end, and wherein the pipeline extends with an upward slope towards the pipeline end.

12. A method for exhausting breather air of an oil separator in a turbofan engine, comprising:
providing:
- a primary flow channel extending through a gas generator wherein a primary flow flows through the gas generator via the primary flow channel during operation of the turbofan engine;
- a secondary flow channel for guiding a secondary flow past the gas generator during the operation of the turbofan engine;
- an oil separator of a lube oil system, wherein the oil separator includes a pipeline for discharging breather air;
- a pipeline end formed from a portion of the pipeline at an axially downstream end section of the pipeline;
- a strut arranged in the secondary flow channel;
- wherein the pipeline extends at least partially inside the strut, and wherein the pipeline end protrudes from an axially downstream end of the strut in a direction of the secondary flow and opens directly to the secondary flow channel, discharging breather air directly from the pipeline end into the secondary flow channel;
- wherein the pipeline end extends from the pipeline in a direction parallel to the direction of the secondary flow inside the secondary flow channel to discharge the breather air in the direction parallel to the direction of the secondary flow; and
- wherein the pipeline end is arranged inside the secondary flow channel in a downstream 20% of an axial length of the secondary flow channel; and
- discharging the breather air into the secondary flow channel in the downstream 20% of the axial length of the secondary flow channel.

13. The method according to claim 12, and further comprising transporting the breather air in the pipeline end, wherein the breather air is subsequently exhausted in a direction parallel to the direction of the secondary flow.

14. The method according to claim 12, and further comprising:
- providing an inner wall of the secondary flow channel and an outer wall of the secondary flow channel; and
- discharging the breather air into the secondary flow channel closer to the inner wall than the outer wall.

15. The method according to claim 12, and further comprising:
- providing a mixer axially downstream from the pipeline end;
- discharging the breather air into the secondary flow upstream of the mixer; and
- intermixing the primary flow and the secondary flow such that a part of the breather air is supplied to the mixer and a part of the breather air is guided past the mixer.

16. The method according to claim 12, and further comprising discharging the breather air into the secondary flow channel in a downstream 10% of the axial length of the secondary flow channel.

17. The method according to claim 12, and further comprising:
- discharging the breather air at an axial distance from the strut.

* * * * *